(12) United States Patent
Zang et al.

(10) Patent No.: US 9,830,509 B2
(45) Date of Patent: Nov. 28, 2017

(54) METHOD AND APPARATUS FOR CONSTRUCTING A DIGITAL ELEVATION MODEL UTILIZING GROUND POINTS CAPTURED BY GROUND-BASED LIDAR

(71) Applicant: Nokia Technologies Oy, Espoo (FI)

(72) Inventors: Andi Zang, Chicago, IL (US); Xin Chen, Chicago, IL (US)

(73) Assignee: Nokia Technologies Oy, Espoo (FI)

( * ) Notice: Subject to any disclaimer, the term of this patent is extended or adjusted under 35 U.S.C. 154(b) by 154 days.

(21) Appl. No.: 14/754,629

(22) Filed: Jun. 29, 2015

(65) Prior Publication Data
US 2017/0083763 A1    Mar. 23, 2017

(51) Int. Cl.
*G06K 9/00*    (2006.01)
*G01S 17/89*   (2006.01)
(Continued)

(52) U.S. Cl.
CPC ........ *G06K 9/00476* (2013.01); *G01B 11/303* (2013.01); *G01C 5/00* (2013.01);
(Continued)

(58) Field of Classification Search
CPC .... G06K 9/00476; G06K 9/52; G06K 9/6267; G06T 7/11; G06T 7/73; G06T 11/60; G01B 11/303; G01C 5/00; G01S 17/89
See application file for complete search history.

(56) References Cited

U.S. PATENT DOCUMENTS 6,987,520 B2 *  1/2006  Criminisi ................ G06T 11/40
                                                  345/582
7,046,841 B1 *  5/2006  Dow ....................... G01C 11/00
                                                  345/419
(Continued)

FOREIGN PATENT DOCUMENTS

CN    102737357    * 10/2012    ............ G06T 1/100
CN    102865852 A    1/2013
(Continued)

OTHER PUBLICATIONS

International Search Report and Written Opinion from International Patent Application No. PCT/FI2016/050436 dated Sep. 21, 2016.
(Continued)

*Primary Examiner* — Amara Abdi
(74) *Attorney, Agent, or Firm* — Alston & Bird LLP

(57) ABSTRACT

A method, apparatus and computer program product are provided to construct a digital elevation model utilizing ground points captured by ground-based light detection and ranging (LiDAR). In the context of a method, a plurality of ground points are extracted from a data set captured by ground-based LiDAR to construct a digital elevation model. Each ground point includes positional information including an altitude. The method also includes identifying one or more road structures that are altitudinally offset from surrounding terrain based upon the plurality of ground points and modifying the ground points of the digital elevation model that are representative of the one or more road (Continued)

structures that are altitudinally offset from the surrounding terrain. The method further includes at least partially filling regions in the digital elevation model that lack ground points captured by ground-based LiDAR.

21 Claims, 6 Drawing Sheets

(51) Int. Cl.
| | |
|---|---|
| *G06T 17/05* | (2011.01) |
| *G06T 5/00* | (2006.01) |
| *G06T 5/50* | (2006.01) |
| *G01S 7/48* | (2006.01) |
| *G06T 7/11* | (2017.01) |
| *G06T 7/73* | (2017.01) |
| *G01B 11/30* | (2006.01) |
| *G01C 5/00* | (2006.01) |
| *G06K 9/52* | (2006.01) |
| *G06K 9/62* | (2006.01) |
| *G06T 11/60* | (2006.01) |

(52) U.S. Cl.
CPC ............ *G01S 7/4808* (2013.01); *G01S 17/89* (2013.01); *G06K 9/52* (2013.01); *G06K 9/6267* (2013.01); *G06T 5/005* (2013.01); *G06T 5/50* (2013.01); *G06T 7/11* (2017.01); *G06T 7/73* (2017.01); *G06T 11/60* (2013.01); *G06T 17/05* (2013.01); *G06T 2200/04* (2013.01); *G06T 2200/08* (2013.01); *G06T 2207/10044* (2013.01); *G06T 2207/20221* (2013.01); *G06T 2207/30184* (2013.01)

(56) References Cited

U.S. PATENT DOCUMENTS

| | | | |
|---|---|---|---|
| 7,194,389 B2 | 3/2007 | Damron | |
| 2008/0042815 A1* | 2/2008 | Breed | B60N 2/2863 340/435 |
| 2010/0017060 A1 | 1/2010 | Zhang et al. | |
| 2011/0164037 A1 | 7/2011 | Yoshida et al. | |
| 2011/0282578 A1* | 11/2011 | Miksa | G06F 17/30241 701/532 |
| 2015/0356357 A1* | 12/2015 | McManus | G06K 9/00791 382/104 |

FOREIGN PATENT DOCUMENTS

| | | | | |
|---|---|---|---|---|
| CN | 103065295 | * | 4/2013 | ............... G01S 7/48 |
| CN | 104992467 A | | 10/2015 | |
| KR | 101011814 B1 | | 2/2011 | |
| WO | WO 2012/134238 A2 | | 10/2012 | |

OTHER PUBLICATIONS

Sharma, Maneesh et al.; "DEM Development from Ground-Based LiDAR Data: A Method to Remove Non-Surface Objects"; Remote Sens. 2010; 2; pp. 2629-2642.

* cited by examiner

METHOD AND APPARATUS FOR CONSTRUCTING A DIGITAL ELEVATION MODEL UTILIZING GROUND POINTS CAPTURED BY GROUND-BASED LIDAR

TECHNOLOGICAL FIELD

An example embodiment relates generally to the construction of a digital elevation model and, more particularly, to the construction of a digital elevation model utilizing ground points captured by ground-based laser detection and ranging (LiDAR).

BACKGROUND

The demand by navigation systems, such as the navigation systems utilized by manned vehicles as well as the navigation systems utilized by autonomous self-driving vehicles, for high-definition maps is ever increasing. In order to generate high-definition maps, a high resolution digital terrain model (DTM) or a digital elevation model (DEM), which provides two-dimensional (2D) discrete functions of elevation, must generally be constructed. For purposes of the subsequent discussion, both a DTM and a DEM will generally be referenced as a DEM. A DEM defines the elevation of the terrain without consideration of the structures, such as buildings, or other objects, such as trees, that rise above and occlude the terrain.

To survey a large area, most DEM providers, such as the U.S. Geological Survey (USGS) and the Earth Remote Sensing Data Analysis Center (ERDAC) employ flying platforms, such as remote sensing satellites and airborne laser scanners. These acquisition techniques enable a large territory to be surveyed, but the data captured by the flying platforms has relatively low precision and introduces measurement errors, such that the resolution of the resulting DEM is on the level of meters. In contrast, the resolution of high-definition maps, such as those desired for navigation systems of autonomous self-driving cars, is much smaller, such as millimeter-level in some instances. Additionally, surveying an area from a flying platform is limited by various constraints, such as cost and operating altitude, such that system error and random error are difficult to reduce. Further, the data captured by a survey conducted from a flying platform initially defines a digital surface model (DSM), which includes buildings, trees and other objects which, in turn, can distort the representation of the underlying terrain that is essential for navigation purposes. A DEM can be computed from a DSM, but the computation comes with significant additional effort. In this regard, a DEM may be computed from the DSM in an automated fashion or manual effort may be employed to remove the objects occluding the terrain. For example, the DSM obtained from a flying platform may be measured, verified and/or corrected by manual survey that defines various control points throughout the area surveyed from the flying platform. However, the manual survey requires significant manpower and resources and can only provide coverage of a relatively small area.

Since the survey of an area from a flying platform utilizing, for example, LiDAR cannot penetrate through obstacles that cover the underlying terrain, such as trees in a forest, the use of ground-based LiDAR to generate a DTM has been proposed. At least some of these techniques rely upon sensors that are fixed upon the ground and, as a result, may only survey relatively small regions. Additionally, the techniques that utilize ground-based LiDAR also utilize other methodologies to remove non-surface objects which, in turn, increase the computing resources and/or the manpower required to generate a DEM. Additionally, these techniques are generally limited to the removal of non-surface objects, such as buildings and trees, that are much smaller than the surrounding surface area that is not occluded and that is directly measured by ground-based LiDAR. As such, the use of ground-based LiDAR is limited and, in at least some instances, is impractical since the non-surface objects are frequently larger objects, such as buildings or the like, which cannot be effectively removed in order to generate the DEM.

BRIEF SUMMARY

A method, apparatus and computer program product are provided in accordance with an example embodiment in order to construct a digital elevation model utilizing ground points captured by ground-based light detection and ranging (LiDAR). By relying upon ground points captured by ground-based LiDAR, the accuracy of the digital elevation model may be enhanced, particularly in urban areas in which buildings may limit the accuracy of ground points captured by airborne survey techniques. Additionally, the method, apparatus and computer program product of an example embodiment may further improve the accuracy of the digital elevation model by identifying road structures, such as flyovers, bridges and tunnels, and modifying the digital elevation model to take into account these road structures. Further, the method, apparatus and computer program product of an example embodiment may also generate a more comprehensive digital elevation model by at least partially filling regions in the digital elevation model that lack ground points captured by ground-based LiDAR.

In an example embodiment, a method is provided that includes extracting a plurality of ground points from a data set captured by ground-based LiDAR to construct a digital elevation model. Each ground point includes positional information including an altitude. The method of this example embodiment also includes identifying one or more road structures that are altitudinally offset from surrounding terrain based upon the plurality of ground points and modifying the ground points of the digital elevation model that are representative of the one or more road structures that are altitudinally offset from the surrounding terrain. The method of this example embodiment also includes at least partially filling regions in the digital elevation model that lack ground points captured by ground-based LiDAR.

The method of an example embodiment at least partially fills regions in the digital elevation model by at least partially filling one or more of the regions in the digital elevation model with ground points from another data set that correspond to the one or more regions and that were captured by a different technique. A method of an another example embodiment at least partially fills regions in the digital elevation model by defining the ground points in one or more of the regions of the digital elevation model based upon interpolation of at least some of the ground points extracted from the data set in proximity to the one or more regions of the digital elevation model.

In an example embodiment, the method identifies one or more road structures by determining a standard deviation of the one or more ground points that project to each of a plurality of pixels of the digital elevation model, and by identifying a flyover in an instance in which the standard deviation of a plurality of pixels of the digital elevation model satisfy a predefined threshold. The method of this example embodiment also modifies the ground points of the digital elevation model that are representative of the one or more road structures by defining the altitude of the ground points of the digital elevation model that are representative of the flyover based upon the altitude of a lower altitude concentration of the ground points.

The method of an example embodiment identifies one or more road structures by identifying one or more road structures comprises determining differences in altitude between the one or more ground points that project to each of a plurality of pixels of the digital elevation model at a corresponding location that were captured by different techniques and identifying a bridge or a tunnel based upon a larger difference in altitude between the ground points of a corresponding location captured by the different techniques and projected onto the plurality of pixels. In this example embodiment, the method also includes modifying the ground points of the digital elevation model that are representative of the one or more road structures by defining the altitude of the ground points of the digital elevation model that were projected onto pixels and are representative of the bridge or the tunnel based upon the altitude of the ground points of the corresponding location that were captured by the different technique other than ground-based LiDAR and projected onto corresponding pixels.

The method of an example embodiment extracts the plurality of ground points by projecting a plurality of ground points onto a pixel of the digital elevation model and defining the altitude of the ground point representative of the pixel based upon a statistical measure of the respective altitudes of the ground point projected onto the pixel.

In another example embodiment, an apparatus is provided that includes at least one processor and at least one memory including computer program code with the at least one memory and the computer program code configured to, with the processor, cause the apparatus to at least extract a plurality of ground points from a data set captured by ground-based LiDAR to construct a digital elevation model. Each ground point includes positional information including an altitude. The at least one memory and the computer program code are also configured to, with the processor, cause the apparatus of this example embodiment to identify one or more road structures that are altitudinally offset from surrounding terrain based upon the plurality of ground points and to modify the ground points of the digital elevation model that are representative of the one or more road structures that are altitudinally offset from the surrounding terrain. The at least one memory and the computer program code are further configured to, with the processor, cause the apparatus of this example embodiment to at least partially fill regions in the digital elevation model that lack ground points captured by ground-based LiDAR.

The at least one memory and the computer program code are configured to, with the processor, cause the apparatus of an example embodiment to at least partially fill regions in the digital elevation model by at least partially filling one or more of the regions in the digital elevation model with ground points from another data set that correspond to the one or more regions and that were captured by a different technique. The at least one memory and the computer program code are configured to, with the processor, cause the apparatus of another example embodiment to at least partially fill regions in the digital elevation model by defining the ground points in one or more of the regions of the digital elevation model based upon interpolation of at least some of the ground points extracted from the data set in proximity to the one or more regions of the digital elevation model.

In an example embodiment, the at least one memory and the computer program code are configured to, with the processor, cause the apparatus to identify one or more road structures by determining a standard deviation of the one or more ground points that project to each of a plurality of pixels of the digital elevation model, and by identifying a flyover in an instance in which the standard deviation of a plurality of pixels of the digital elevation model satisfy a predefined threshold. The at least one memory and the computer program code are also configured to, with the processor, cause the apparatus of this example embodiment to modify the ground points of the digital elevation model that are representative of the one or more road structures by defining the altitude of the ground points of the digital elevation model that are representative of the flyover based upon the altitude of a lower altitude concentration of the ground points.

The at least one memory and the computer program code are configured to, with the processor, cause the apparatus of an example embodiment to identify one or more road structures by determining differences in altitude between the one or more ground points that project to each of a plurality of pixels of the digital elevation model at a corresponding location that were captured by different techniques and identifying a bridge or a tunnel based upon a larger difference in altitude between the ground points of a corresponding location captured by the different techniques and projected onto the plurality of pixels. The at least one memory and the computer program code are also configured to, with the processor, cause the apparatus of this example embodiment to modify the ground points of the digital elevation model that are representative of the one or more road structures by defining the altitude of the ground points of the digital elevation model that were projected onto pixels and are representative of the bridge or the tunnel based upon the altitude of the ground points of the corresponding location that were captured by the different technique other than ground-based LiDAR and projected onto corresponding pixels.

The at least one memory and the computer program code are also configured to, with the processor, cause the apparatus of an example embodiment to extract the plurality of ground points by projecting a plurality of ground points onto a pixel of the digital elevation model and defining the altitude of the ground point representative of the pixel based upon a statistical measure of the respective altitudes of the ground point projected onto the pixel.

In a further example embodiment, a computer program product is provided that includes at least one non-transitory computer-readable storage medium having computer-executable program code portions stored therein with the computer-executable program code portions including program code instructions configured to extract a plurality of ground points from a data set captured by ground-based LiDAR to construct a digital elevation model. Each ground point includes positional information including an altitude. The computer-executable program code portions of this example embodiment also includes program code instructions configured to identify one or more road structures that are altitudinally offset from surrounding terrain based upon the plurality of ground points and to modify the ground points of the digital elevation model that are representative of the one or more road structures that are altitudinally offset from the surrounding terrain. The computer-executable program code portions of this example embodiment further include program code instructions configured to at least partially fill regions in the digital elevation model that lack ground points captured by ground-based LiDAR.

The program code instructions configured to at least partially fill regions in the digital elevation model include, in an example embodiment, program code instructions configured to at least partially fill one or more of the regions in the digital elevation model with ground points from another data set that correspond to the one or more regions and that were captured by a different technique. In another example embodiment, the program code instructions configured to at least partially fill regions in the digital elevation model include program code instructions configured to define the ground points in one or more of the regions of the digital elevation model based upon interpolation of at least some of the ground points extracted from the data set in proximity to the one or more regions of the digital elevation model.

In an example embodiment, the program code instructions configured to identify one or more road structures include program code instructions configured to determine a standard deviation of the one or more ground points that project to each of a plurality of pixels of the digital elevation model, and program code instructions configured to identify a flyover in an instance in which the standard deviation of a plurality of pixels of the digital elevation model satisfy a predefined threshold. In this example embodiment, the program code instructions configured to modify the ground points of the digital elevation model that are representative of the one or more road structures include program code instructions configured to define the altitude of the ground points of the digital elevation model that are representative of the flyover based upon the altitude of a lower altitude concentration of the ground points.

In an example embodiment, the program code instructions configured to identify one or more road structures include program code instructions configured to determine differences in altitude between the one or more ground points that project to each of a plurality of pixels of the digital elevation model at a corresponding location that were captured by different techniques and program code instructions configured to identify a bridge or a tunnel based upon a larger difference in altitude between the ground points of a corresponding location captured by the different techniques and projected onto the plurality of pixels. In this example embodiment, the program code instructions configured to modify the ground points of the digital elevation model that are representative of the one or more road structures also include program code instructions configured to define the altitude of the ground points of the digital elevation model that were projected onto pixels and are representative of the bridge or the tunnel based upon the altitude of the ground points of the corresponding location that were captured by the different technique other than ground-based LiDAR and projected onto corresponding pixels.

In an example embodiment, the program code instructions configured to extract the plurality of ground points include program code instructions configured to project a plurality of ground points onto a pixel of the digital elevation model and program code instructions configured to define the altitude of the ground point representative of the pixel based upon a statistical measure of the respective altitudes of the ground point projected onto the pixel.

In yet another example embodiment, an apparatus is provided that includes means for extracting a plurality of ground points from a data set captured by ground-based LiDAR to construct a digital elevation model. Each ground point includes positional information including an altitude. The apparatus of this example embodiment also includes means for identifying one or more road structures that are altitudinally offset from surrounding terrain based upon the plurality of ground points and means for modifying the ground points of the digital elevation model that are representative of the one or more road structures that are altitudinally offset from the surrounding terrain. The apparatus of this example embodiment also includes means for at least partially filling regions in the digital elevation model that lack ground points captured by ground-based LiDAR.

BRIEF DESCRIPTION OF THE DRAWINGS

Figure 1:
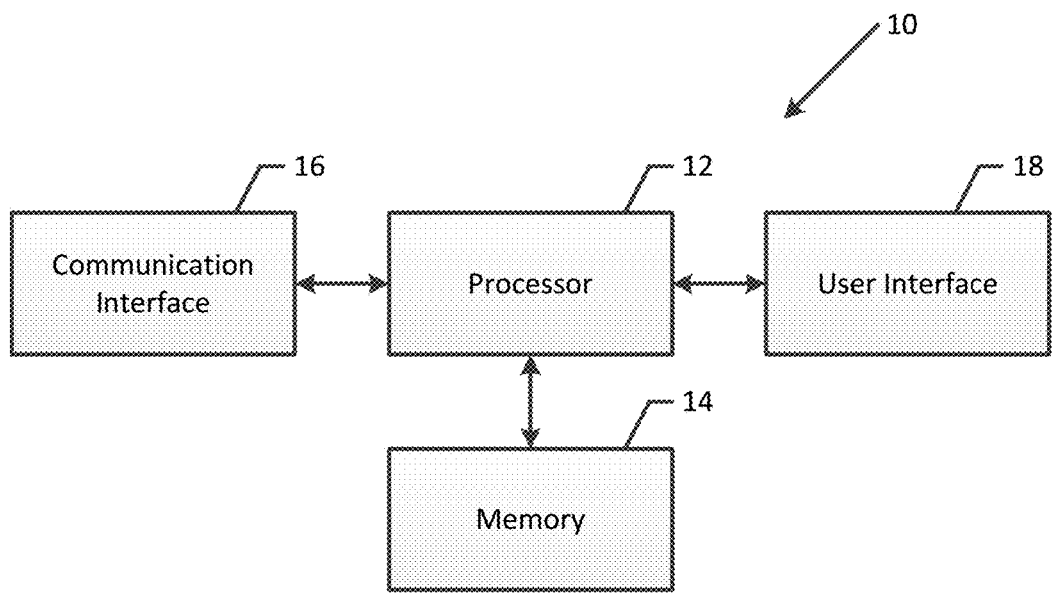
Figure 2:
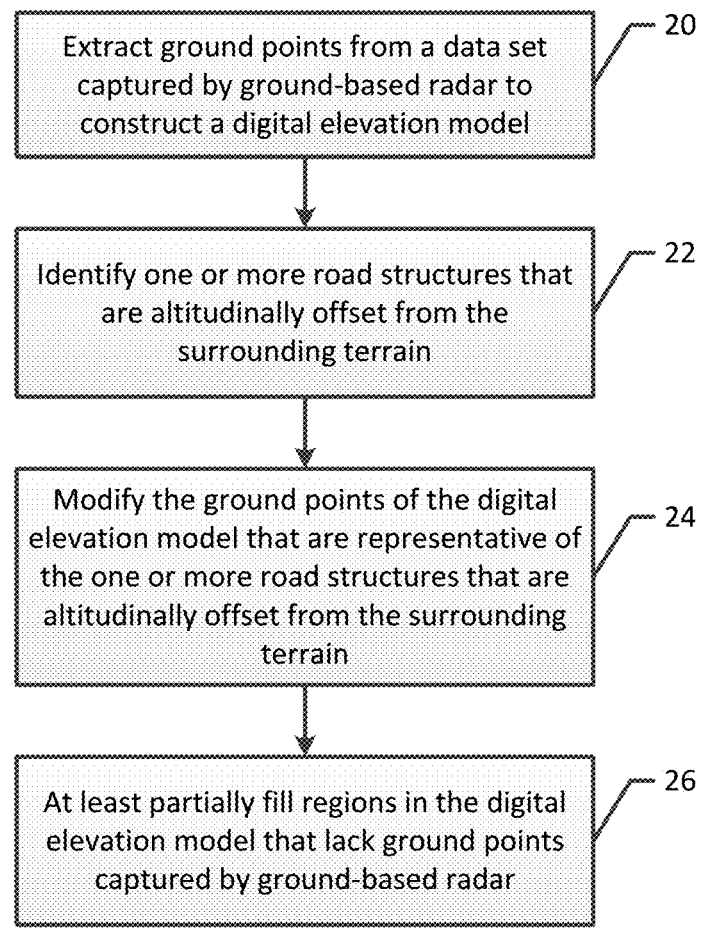
Figure 3:
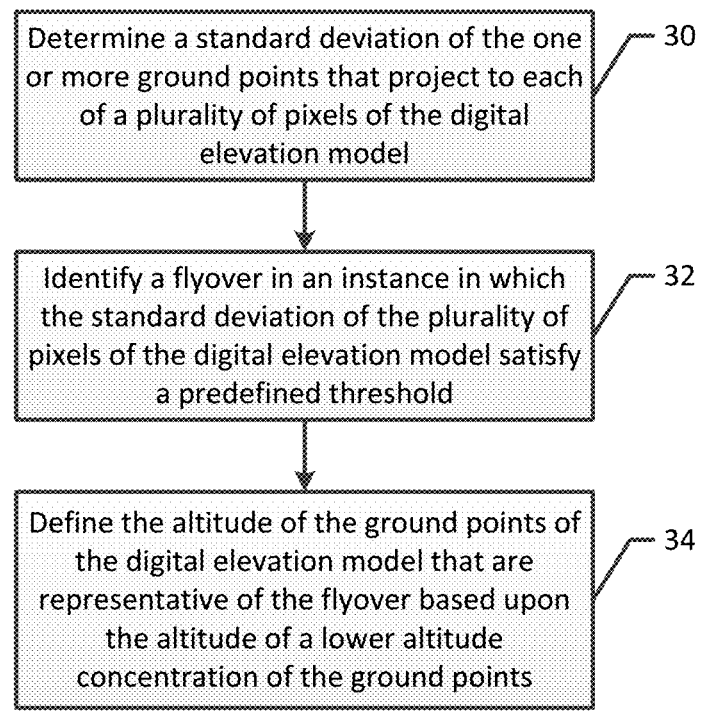
Figure 4:
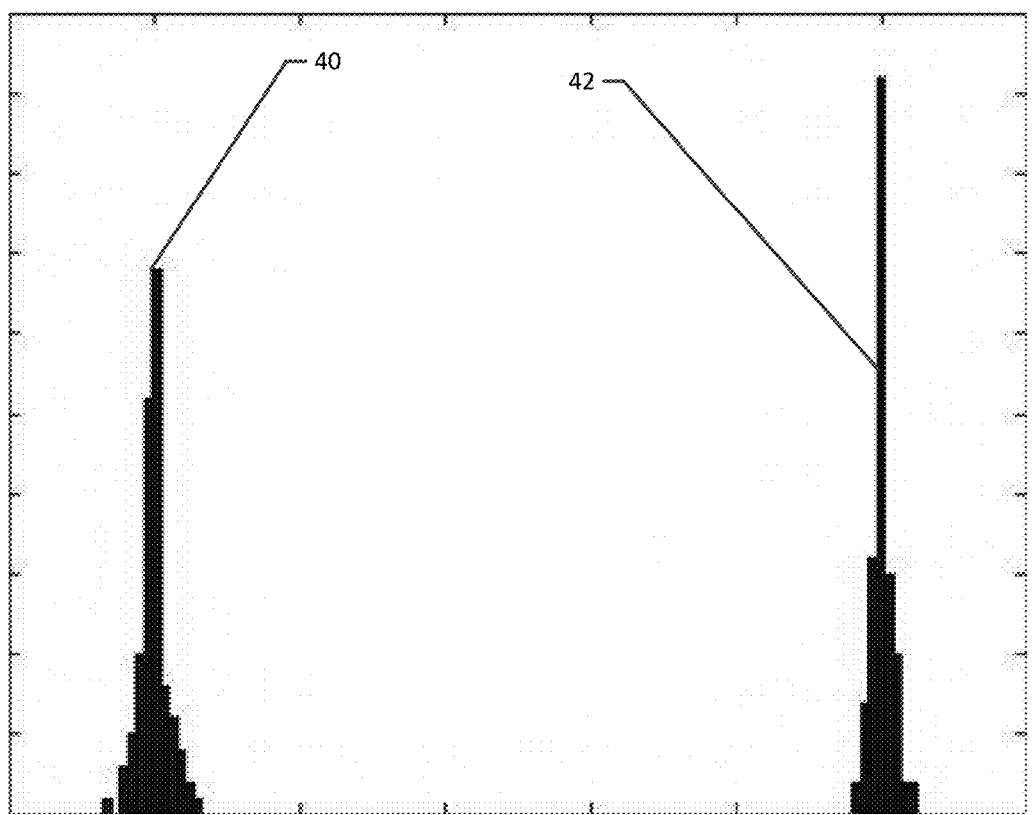
Figure 5:
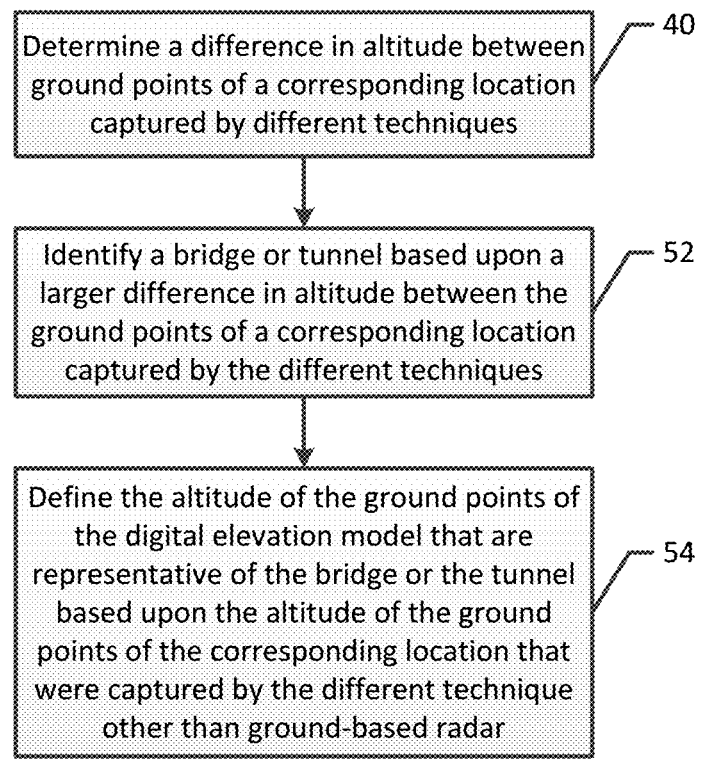
Figure 6:
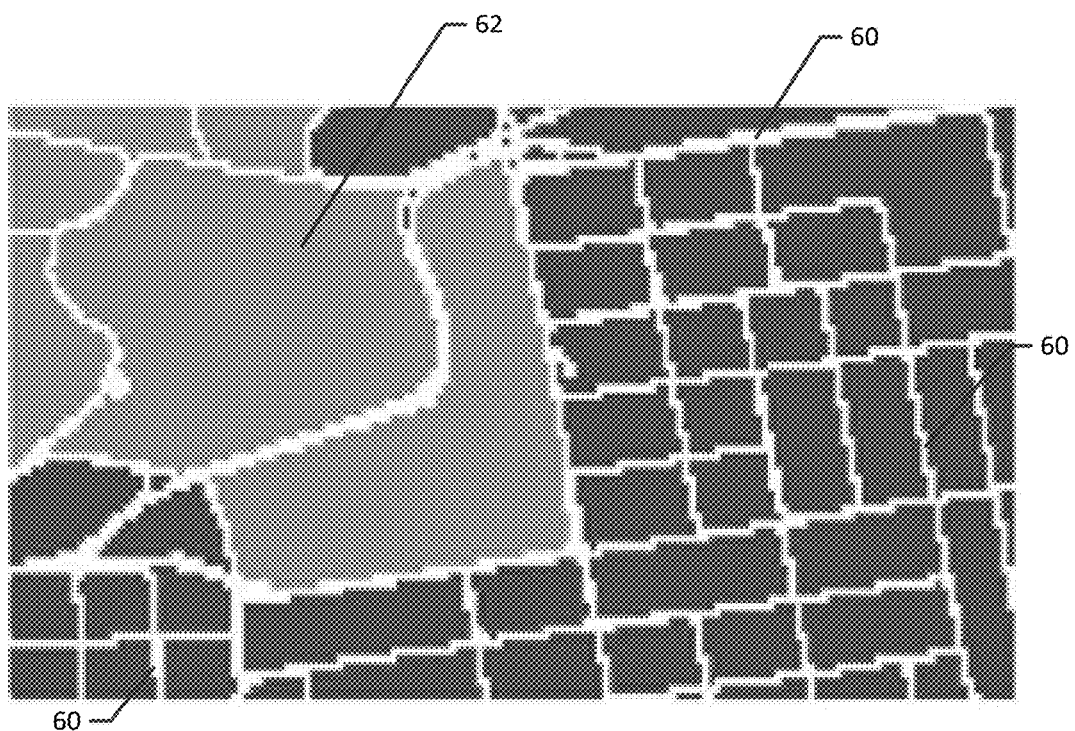

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present invention;

FIG. 2 is a flowchart illustrating operations performed in accordance with an example embodiment of the present invention;

FIG. 3 is a flowchart illustrating operations performed to identify a flyover and to modify the ground points of the digital elevation model based upon the identification of the flyover in accordance with an example embodiment of the present invention;

FIG. 4 is a histogram of altitude values for ground points projected onto pixels in a region that corresponds to a flyover;

FIG. 5 is a flowchart illustrating operations performed to identify a bridge or a tunnel and to modify the ground points of the digital elevation model based upon the identification of the bridge or the tunnel in accordance with an example embodiment of the present invention; and FIG. 6 a plurality of regions that lack ground points captured by ground-based LiDAR having been filled in accordance with an example embodiment of the present invention

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to construct a DEM utilizing ground points captured by ground-based LiDAR. By relying upon ground points captured by ground-based LiDAR, the accuracy of the DEM may be enhanced, particularly in urban areas in which buildings may limit the accuracy of ground points captured by airborne survey techniques. Additionally, the method, apparatus and computer program product of an example embodiment may further improve the accuracy of the DEM by identifying road structures, such as flyovers, bridges and tunnels, and modifying the DEM to take into account these road structures. Further, the method, apparatus and computer program product of an example embodiment may additionally or alternatively generate a more comprehensive DEM by at least partially filling regions in the digital elevation model that lack ground points captured by ground-based LiDAR. As a result of its accuracy and comprehensiveness, the resulting DEM may be more reliably utilized for a variety of purposes including, for example, by navigation systems including an advanced driver assistance system (ADAS), a global positioning system (GPS), a personal navigation device (PND) or the like as well as by the navigation systems of autonomous vehicles.

The apparatus for generating a DEM utilizing ground points captured by ground-based LiDAR may be embodied by a variety of computing devices including, for example, a navigation system as described above including an ADAS, a GPS system, a PND or the like as well as the navigation system utilized by an autonomous. Additionally or alternatively, the apparatus may be embodied in other types of computing devices, such as a server, a personal computer, a computer workstation, a laptop computer, a plurality of networked computing devices or the like, that are configured to analyze a data set that includes a plurality of ground points in order to construct a DEM. In this regard, FIG. 1 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 10 may be embodied by a computing device including those described above. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device, such as a navigation system) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a database, cloud storage or other external memory device and/or to provide a representation of the road geometry to an in-vehicle GPS system, in-vehicle navigation system, a PND, a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

Referring now to FIG. 2, the operations performed in order to construct a digital elevation model utilizing ground points captured by ground-based LiDAR in accordance with an example embodiment are illustrated. With respect to block 20 of FIG. 2, for example, the apparatus 10 includes means, such as the processor 12 or the like, for extracting a plurality of ground points from a data set captured by ground-based LiDAR to construct a DEM. Each ground point includes positional information, such as latitude, longitude and altitude and, in one example embodiment defines a World Geodetic System 1984 (WGS84) coordinate. Each ground point may optionally include additional information items, such as a time stamp, a LiDAR reflected intensity and/or device information. The data set from which the ground points are extracted may have been captured by various ground-based LiDAR techniques. For example, the ground-based LiDAR data collection devices may be mounted in a vehicle and driven through the streets or otherwise across the terrain that is to be surveyed. In instances in which the ground points are captured by ground-based LiDAR data collection devices may be mounted in a vehicle, the altitude value of a ground point may be based upon the altitude value identified by the ground-based LiDAR data collection device with the height of the ground-based LiDAR data collection device above the road surface being subtracted therefrom. Alternatively, the ground-based LiDAR data collection system may include one or more fixed ground-based LiDAR data collection devices that survey the area or the region thereabout. Regardless of the collection technique, the ground points are generally stored as a data set that defines a LiDAR point cloud, such as locally in memory 14 or remotely in a database, a server, cloud storage or the like.

Typically, the data size of a LiDAR point cloud is quite large. For example, a ten meter length of an urban road may be represented by a LiDAR point cloud that is approximately 100 megabytes in size. As such, the data set may be filtered, such as to remove non-ground points that are clearly erroneous, such as by having incorrect location information. In addition, as the data set captured by ground-based LiDAR includes every spatial entity including buildings, trees and vehicles, the apparatus 10, such as the processor 12 or the like, may be configured to extract the plurality of ground points in such a manner as to extract the ground points representative of the road surface, while filtering out ground points representative of other spatial entities. Although the identification of ground points representative of the road surface may be performed in various manners, the apparatus, such as the processor, of an example embodiment in which the ground points are captured by ground-based LiDAR data collection devices carried by vehicles initially identifies the trajectory points, that is, the ground points located beneath the acquisition vehicle. The apparatus, such as the processor, of this example embodiment then utilizes a region growing technique to identify neighbor points until a non-road surface structure is intersected. These non-surface structures may include curbs, guard rails or grass. Following the region growing method, the ground points representative of the road surface are designated as candidates for extraction, while the other ground points of the data set representative of various other spatial entities are filtered out.

In order to further reduce the number of ground points extracted from the data set, the apparatus 10, such as the processor 12, of an example embodiment may employ a sampling process with the sampling rate dependent upon the resolution of a resulting DEM. In an example embodiment, x and y may denote the location of a ground point in terms of a two-dimensional DEM coordinate and DEM (x,y) may denote the altitude at location (x,y). For the ground points representative of a region, the latitude and longitude of a fixed reference point, such as the upper left point, may have a latitude and longitude that is designated by [lat lon]. In addition, the resolution is defined in terms of latitude per pixel and longitude per pixel and is expressed as [rlat rlon] and the DTM size is expressed in terms of [height width]. As such, the ground points in the data set may be projected onto the pixels of the DEM as follows:

$$DEM(x, y) = \begin{bmatrix} height \\ width \end{bmatrix} + \frac{\left(P - \begin{bmatrix} lat \\ lon \end{bmatrix}\right)}{\begin{bmatrix} -rlat \\ rlon \end{bmatrix}} \quad (1)$$

In a number of instances, multiple ground points will be projected to a single pixel of the DEM. In these instances, the ground points assigned to a single pixel will have a height difference distribution. The apparatus 10, such as the processor 12, may then define the altitude of a respective pixel based upon a statistical measure of the altitudes of the ground points assigned to the respective pixel, such as by defining the altitude of the pixel to be the median value of the altitudes of the ground points assigned to the respective pixel.

As shown in block 22 of FIG. 2, the apparatus 10 of an example embodiment also includes means, such as the processor 12 or the like, for identifying one or more road structures that are altitudinally offset from surrounding terrain based upon the plurality of ground points, such as by having an altitude that differs from the altitude of the surrounding pixels by at least a predefined amount. In instances in which one or more road structures are identified that are altitudinally offset, the apparatus of this example embodiment also includes means, such as the processor or the like, for modifying the ground points of the DEM that are representative of the one or more road structures that are altitudinally offset from the surrounding terrain. See block 24 of FIG. 2. As such, the ground points that are representative of the road structures that are altitudinally offset from the surrounding terrain may be modified to have altitude values that are consistent with the surrounding terrain such that the altitudinal offset of the road structures is eliminated or at least mitigated, thereby insuring that the resulting DEM will accurately represent the ground terrain as opposed to the altitudinally offset road structures.

Various types of altitudinally offset road structures may be identified including, for example, flyovers, such as an overpass or other road structure that is elevated and crosses over an underpass or other road structure that is at ground level. Other types of road structures that are altitudinally offset include bridges and tunnels. In regards to the identification of a flyover, the apparatus 10 of an example embodiment includes means, such as the processor 12 or the like, for determining a standard deviation of the one or more ground points that project to each of a plurality of pixels of a DEM. See block 30 of FIG. 3. By way of example, the set of ground points $GP_1, GP_2, \ldots GP_n$ that project to a single pixel of the DEM may be represented by the set $P(x,y)=\{GP_1, GP_2, \ldots GP_n\}$. For each set of ground points, that is, for the set of ground points that project onto each pixel of the DEM, the apparatus, such as the processor, of this example embodiment is configured to determine the standard deviation for the respective pixel. The apparatus, such as the processor, of this example embodiment then creates a map $S(x,y)$ of standard deviations (STD) of the plurality of pixels as follows: $S(x,y)=STD (P(x,y))$.

As shown in block 32 of FIG. 3, the apparatus 10 of this example embodiment also includes means, such as the processor 12 or the like, for identifying a flyover in an instance in which the standard deviation of a plurality of pixels of the DEM satisfy a predefined threshold. For example, the predefined threshold may be a predefined value that is generally not satisfied by ground points representative of the terrain alone, but is, instead, more likely satisfied in an instance in which the vehicle that carries the ground-based LiDAR data collection device would pass both over the overpass and the underpass so as to obtain ground points that project onto the same pixel, but that have materially different altitudes. In an example embodiment, the apparatus, such as the processor, may require a predefined number of neighboring pixels to include standard deviations that satisfy the predefined threshold in order to identify the flyover.

In regards to modification of the ground points of the DEM that are representative of the one or more road structures that are altitudinally offset, the apparatus 10 of this example embodiment also includes means, such as the processor 12 or the like, for defining the altitude of the ground points of the DEM that are representative of the flyover based upon the altitude of the lower altitude concentration of the ground points. See block 34 of FIG. 3. In this regard, the apparatus, such as the processor, of an example embodiment is configured to construct a histogram of the altitudes of the ground points that project onto the pixels of the DEM that have been identified to have a standard deviation that satisfies the predefined threshold, that is, the pixels of the DEM that correspond to the flyover. See FIG. 4. In the absence of an altitudinally offset road structure, the histogram would generally be a single bell curve. However, in an instance in which there are altitudinally offset road structures, the histogram of altitude values of the ground points includes a plurality of peaks with each peak representing a different road level of the stacked roads. Thus, in an instance in which the flyover is defined by a single overpass crossing a single underpass, the histogram as shown in FIG. 4 may include two peaks with the lower altitude concentration 50 of ground points representative of the altitude of ground points collected during travel across the underpass and the higher altitude concentration 52 of ground points representing the ground points collected during travel across the overpass. In order to better represent the terrain of the ground, the apparatus, such as the processor, of an example embodiment is configured to define the altitude of the ground points of a DEM that have been identified to satisfy a predefined threshold and which are therefore considered to represent a flyover to be based upon, such as by being set equal to, the altitude of the lower altitude concentration of the ground points. In this regard, the altitude of the ground points that correspond to the flyover may be set equal to the median or average of the altitude values that comprise the lower altitude concentration of the ground points.

In regards to the identification of a bridge or tunnel, the apparatus 10 of an example embodiment includes means, such as the processor 12 or the like, for determining differences in altitude between the one or more ground points that project to each of a plurality of pixels of the digital elevation model at a corresponding location that were captured by different techniques as shown in block 50 of FIG. 5. In this regard, the different techniques for capturing the ground points may include ground-based LiDAR as described above, as well as another, different type of technique for capturing ground points, such as an airborne technique for capturing ground points, such as employed by the USGS. In this regard, although the altitudes at certain locations vary between the ground points collected by ground-based LiDAR and by the other technique, the altitude differences in a relatively small area have referential meaning. Thus, the differences in altitude between ground points of a corresponding location captured by different techniques and projected onto pixels are determined. In the absence of an altitudinally offset road structure, the difference between the altitudes of the ground points projected onto pixels that were captured by the different techniques should be substantially constant, such as by varying by only a small amount. This difference in the altitudes of the ground points captured by different techniques and projected onto pixels in the absence of an altitudinally offset road structure may be referenced as δh.

However, the difference in altitude values for ground points captured by the different techniques and projected onto pixels that are representative of a bridge or tunnel generally have a much greater difference therebetween.

Thus, the apparatus 10 of this example embodiment includes means, such as the processor 12 or the like, for identifying a bridge or a tunnel based upon a larger difference in altitude between the ground points of a corresponding location captured by different techniques and projected onto pixels. See block 52 of FIG. 5. Although reference is made to a difference in altitude between ground points, this reference also includes a difference in altitude of pixels, each of which represents zero or more ground points that are projected thereonto. In this regard, the apparatus, such as the processor, may be configured to identify a bridge or a tunnel in an instance in which the difference in altitude between the ground points of a corresponding location captured by different techniques and projected onto a pixel satisfies, such as exceeds, a predefined threshold, such as a predefined value or a predefined multiple of δh. For example, the difference in altitude between ground points of a corresponding location captured by ground-based LiDAR and by the airborne techniques employed by the USGS may be about 0.3 meters in the absence of a bridge or tunnel (that is, δh=0.3 meters) and about 30 meters in an instance in which the ground points correspond to a bridge or tunnel. In an example embodiment, the apparatus, such as the processor, may also require a predefined number of neighboring ground points (or pixels) to exhibit a difference in altitude that satisfies the predefined threshold in order to identify the bridge or tunnel.

In regards to the modification of the ground points of the DEM that are representative of the one or more altitudinally offset road structures, the apparatus 10 of this example embodiment also includes means, such as the processor 12 or the like, for defining the altitude of the ground points (as projected onto pixels) of the DEM that are representative of a bridge or tunnel based upon the altitude of the ground points at the corresponding locations that were captured by the different technique other than ground-based LiDAR and projected onto corresponding pixels. See block 54 of FIG. 5. In the foregoing example, the ground points (as well as the pixels onto which the ground points are projected) that have been identified to correspond to the bridge or tunnel may therefore be defined, not based upon the altitude of the ground points captured by ground-based LiDAR, but based upon the other technique, such as the airborne survey conducted by the USGS. In instances in which an altitude difference δh exists between the altitude of the ground points captured by ground-based LiDAR and the altitude values captured by the different technique, such as the airborne technique employed by the USGS, for regions that do not include a bridge or tunnel, the altitude values DEM(x,y) of the ground points (as projected onto a pixel) that are representative of the bridge or tunnel may be set equal to the altitude values of the corresponding ground points captured by the different technique and projected onto a corresponding pixel with an offset based upon the altitude difference δh between the ground points captured by the two different techniques in the absence of a bridge or tunnel, such as in accordance with the following: $DEM(x,y)=DEM_r(x,y)-\delta h$. In this regard, DEM, represents the altitude values captured by the different technique.

For ground points captured by ground-based LiDAR, there may be regions, such as substantial regions, for which ground points cannot be captured by ground-based LiDAR. These regions may include, for example, large parks or cemeteries or large building complexes that do not include public roads. In one example embodiment, FIG. 6 depicts a portion of a map in which ground points have been captured by ground-based LiDAR data collection devices carried by vehicles driven along the streets 60. Thus, the region that includes the relatively dense network of streets can be accurately represented by the ground points captured by ground-based LiDAR, while the large region 62 that lacks many streets does not include ground points captured by ground-based LiDAR. As a result of the regions that lack ground points captured by ground-based LiDAR, the apparatus 10 of an example embodiment also includes means, such as the processor 12 or the like, for at least partially filling regions in the DEM that lack ground points captured by ground-based LiDAR. See block 26 of FIG. 2. The apparatus, such as the processor, may at least partially fill these regions of the DEM that lack ground points captured by ground-based LiDAR in various manners.

For example, the apparatus 10 of an example embodiment includes means, such as the processor 12 or the like, for at least partially filling regions in the DEM with ground points from another data set that correspond to the one or more regions that lack ground-based LiDAR captured ground point sand that were captured by a different technique. For example, as described above with respect to a bridge or a tunnel, the regions of a DEM that lack ground points captured by a ground-based LiDAR may be filled with the ground points captured by another technique, such as the airborne technique employed by the USGS. As also described above, the altitude values of the ground points captured by the other technique may be offset by the average altitude difference δh of the altitude of the ground points captured by ground-based LiDAR and the altitude of the corresponding ground points captured by the another technique.

Additionally or alternatively, the apparatus 10, such as the processor 12 or the like, may at least partially fill regions of the DEM by defining the ground points in the one or more regions of the DEM that lack ground-based LiDAR captured ground points based upon the interpolation of at least some of the ground points extracted from the data set in proximity to the one or more regions of the DEM. For example, the apparatus, such as the processor, of this example embodiment may be configured to interpolate the altitude of the ground points within the region that lacks ground points captured by ground-based LiDAR based upon the altitude of the ground points captured by ground-based LiDAR that are proximate to, such as adjacent to, the region that lacks ground points captured by ground-based LiDAR. Although the apparatus, such as the processor, may be to interpolate the ground points in various manners, the apparatus, such as the processor, of an example embodiment is configured to perform bilinear interpolation to fit a plane. In an example embodiment, the apparatus, such as the processor, fills the regions that lack ground points captured by ground-based LiDAR through interpolation in an instance in which the region is completely surrounded or bounded by a closed loop of ground points that have been captured by ground-based LiDAR, while regions that are not completely surrounded by ground points captured by ground-based LiDAR, that is, an open loop, may be filled with ground points that are based upon the ground points captured by another technique.

In another example embodiment, the region that lacks ground points captured by ground-based LiDAR, is divided into blocks. In an instance in which the standard deviation of the distances to the fitted plane of all known pixels in the block from the ground points captured by ground-based LiDAR satisfies a threshold, such as by exceeding a threshold, the block may be considered to contain a hill or basin. In this instance, the block may then be filled with ground points for the corresponding location that were captured by another technique. However, if the threshold is not satisfied, the block may be filled by interpolation from the adjacent ground points captured by ground-based LiDAR, such as by bilinear interpolation to the plane.

As described above, a method, apparatus 20 and computer program product are provided in accordance with an example embodiment in order to construct a DEM utilizing ground points captured by ground-based LiDAR. By relying upon ground points captured by ground-based LiDAR, the accuracy of the DEM may be enhanced, particularly in urban areas in which buildings may limit the accuracy of ground points captured by airborne survey techniques, and the resolution of the DEM may be improved, such as by providing millimeter-level resolution in some embodiments. Additionally, the method, apparatus and computer program product of an example embodiment may further improve the accuracy of the digital elevation model by identifying road structures that are altitudinally offset from the surrounding terrain, such as flyovers, bridges and tunnels, and modifying the DEM to take into account these road structures. Further, the method, apparatus and computer program product of an example embodiment may additionally or alternatively generate a more comprehensive DEM by at least partially filling regions in the DEM that lack ground points captured by ground-based LiDAR. As a result of its accuracy and comprehensiveness, the resulting DEM may be more reliably utilized for a variety of purposes including, for example, by navigation systems, such as navigation onboard manned vehicles as well as by the navigation systems of self-driving autonomous vehicles.

FIGS. 2, 3 and 5 illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
extracting a plurality of ground points from a data set captured by ground-based laser detection and ranging (LiDAR) to construct a digital elevation model, wherein each ground point includes positional information including an altitude;
identifying one or more road structures that are altitudinally offset from surrounding terrain based upon the plurality of ground points; and
modifying the ground points of the digital elevation model that are representative of the one or more road structures that are altitudinally offset from the surrounding terrain, wherein modifying the ground points comprising mitigating or eliminating altitudinal offset of the ground points of the digital elevation model that are representative of the one or more road structures that were identified to be altitudinally offset from the surrounding terrain so as to be more consistent with the surrounding terrain as opposed to the one or more road structures that were identified to be altitudinally offset from the surrounding terrain.

2. A method according to claim 1 wherein at least partially filling regions in the digital elevation model comprises at least partially filling one or more of the regions in the digital elevation model with ground points from another data set that correspond to the one or more regions and that were captured by a different technique.

3. A method according to claim 1 wherein at least partially filling regions in the digital elevation model comprises defining the ground points in one or more of the regions of the digital elevation model based upon interpolation of at least some of the ground points extracted from the data set in proximity to the one or more regions of the digital elevation model.

4. A method according to claim 1 wherein identifying one or more road structures comprises determining a standard deviation of the one or more ground points that project to each of a plurality of pixels of the digital elevation model, and identifying a flyover in an instance in which the standard deviation of a plurality of pixels of the digital elevation model satisfy a predefined threshold, and wherein modifying the ground points of the digital elevation model that are representative of the one or more road structures comprises defining the altitude of the ground points of the digital elevation model that are representative of the flyover based upon the altitude of a lower altitude concentration of the ground points.

5. A method according to claim 1 wherein identifying one or more road structures comprises determining differences in altitude between the one or more ground points that project to each of a plurality of pixels of the digital elevation model at a corresponding location that were captured by different techniques and identifying a bridge or a tunnel based upon a larger difference in altitude between the ground points of a corresponding location captured by the different techniques and projected onto the plurality of pixels, and wherein modifying the ground points of the digital elevation model that are representative of the one or more road structures comprises defining the altitude of the ground points of the digital elevation model that were projected onto pixels and are representative of the bridge or the tunnel based upon the altitude of the ground points of the corresponding location that were captured by the different technique other than ground-based LiDAR and projected onto corresponding pixels.

6. A method according to claim 1 wherein extracting the plurality of ground points comprises projecting a plurality of ground points onto a pixel of the digital elevation model and defining the altitude of the ground point representative of the pixel based upon a statistical measure of the respective altitudes of the ground point projected onto the pixel.

7. An apparatus comprising at least one processor and at least one memory including computer program code, the at least one memory and computer program code configured to, with the processor, cause the apparatus to at least:
extract a plurality of ground points from a data set captured by ground-based laser detection and ranging (LiDAR) to construct a digital elevation model, wherein each ground point includes positional information including an altitude;
identify one or more road structures that are altitudinally offset from surrounding terrain based upon the plurality of ground points; and
modify the ground points of the digital elevation model that are representative of the one or more road structures that are altitudinally offset from the surrounding terrain,
wherein the at least one memory and computer program code are configured to, with the processor, cause the apparatus to modify the ground points by mitigating or eliminating altitudinal offset of the ground points of the digital elevation model that are representative of the one or more road structures that were identified to be altitudinally offset from the surrounding terrain so as to be more consistent with the surrounding terrain as opposed to the one or more road structures that were identified to be altitudinally offset from the surrounding terrain.

8. An apparatus according to claim 7 wherein the at least one memory and computer program code are configured to, with the processor, cause the apparatus to at least partially fill regions in the digital elevation model by at least partially filling one or more of the regions in the digital elevation model with ground points from another data set that correspond to the one or more regions and that were captured by a different technique.

9. An apparatus according to claim 7 wherein the at least one memory and computer program code are configured to, with the processor, cause the apparatus to at least partially fill regions in the digital elevation model by defining the ground points in one or more of the regions of the digital elevation model based upon interpolation of at least some of the ground points extracted from the data set in proximity to the one or more regions of the digital elevation model.

10. An apparatus according to claim 7 wherein the at least one memory and computer program code are configured to, with the processor, cause the apparatus to identify one or more road structures by determining a standard deviation of the one or more ground points that project to each of a plurality of pixels of the digital elevation model, and identifying a flyover in an instance in which the standard deviation of a plurality of pixels of the digital elevation model satisfy a predefined threshold, and wherein the at least one memory and computer program code are configured to, with the processor, cause the apparatus to modify the ground points of the digital elevation model that are representative of the one or more road structures by defining the altitude of the ground points of the digital elevation model that are representative of the flyover based upon the altitude of a lower altitude concentration of the ground points.

11. An apparatus according to claim 7 wherein the at least one memory and the computer program code are configured to, with the processor, cause the apparatus to identify one or more road structures by determining differences in altitude between the one or more ground points that project to each of a plurality of pixels of the digital elevation model at a corresponding location that were captured by different techniques and identifying a bridge or a tunnel based upon a larger difference in altitude between the ground points of a corresponding location captured by the different techniques and projected onto the plurality of pixels, and wherein the at least one memory and the computer program code are configured to, with the processor, cause the apparatus to modify the ground points of the digital elevation model that are representative of the one or more road structures by defining the altitude of the ground points of the digital elevation model that were projected onto pixels and are representative of the bridge or the tunnel based upon the altitude of the ground points of the corresponding location that were captured by the different technique other than ground-based LiDAR and projected onto corresponding pixels.

12. An apparatus according to claim 7 wherein the at least one memory and computer program code are configured to, with the processor, cause the apparatus to extract the plurality of ground points by projecting a plurality of ground points onto a pixel of the digital elevation model and defining the altitude of the ground point representative of the pixel based upon a statistical measure of the respective altitudes of the ground point projected onto the pixel.

13. A computer program product comprising a non-transitory computer-readable storage medium having computer-executable program code portions stored therein, the computer-executable program code portions comprising program code instructions configured to:

extract a plurality of ground points from a data set captured by ground-based laser detection and ranging (LiDAR) to construct a digital elevation model, wherein each ground point includes positional information including an altitude;

identify one or more road structures that are altitudinally offset from surrounding terrain based upon the plurality of ground points; and modify the ground points of the digital elevation model that are representative of the one or more road structures that are altitudinally offset from the surrounding terrain, wherein the program code instructions configured to modify the ground points comprise program code instructions configured to mitigate or eliminate altitudinal offset of the ground points of the digital elevation model that are representative of the one or more road structures that were identified to be altitudinally offset from the surrounding terrain so as to be more consistent with the surrounding terrain as opposed to the one or more road structures that were identified to be altitudinally offset from the surrounding terrain.

14. A computer program product according to claim 13 wherein the program code instructions configured to at least partially fill regions in the digital elevation model comprise program code instructions configured to at least partially fill one or more of the regions in the digital elevation model with ground points from another data set that correspond to the one or more regions and that were captured by a different technique.

15. A computer program product according to claim 13 wherein the program code instructions configured to at least partially fill regions in the digital elevation model comprise program code instructions configured to define the ground points in one or more of the regions of the digital elevation model based upon interpolation of at least some of the ground points extracted from the data set in proximity to the one or more regions of the digital elevation model.

16. A computer program product according to claim 13 wherein the program code instructions configured to identify one or more road structures comprise program code instructions configured to determine a standard deviation of the one or more ground points that project to each of a plurality of pixels of the digital elevation model, and identify a flyover in an instance in which the standard deviation of a plurality of pixels of the digital elevation model satisfy a predefined threshold, and wherein the program code instructions configured to modify the ground points of the digital elevation model that are representative of the one or more road structures comprise program code instructions configured to define the altitude of the ground points of the digital elevation model that are representative of the flyover based upon the altitude of a lower altitude concentration of the ground points.

17. A computer program product according to claim 13 wherein the program code instructions configured to identify one or more road structures comprise program code instructions configured to determine differences in altitude between the one or more ground points that project to each of a plurality of pixels of the digital elevation model at a corresponding location that were captured by different techniques and program code instructions configured to identify a bridge or a tunnel based upon a larger difference in altitude between the ground points of a corresponding location captured by the different techniques and projected onto the plurality of pixels, and wherein the program code instructions configured to modify the ground points of the digital elevation model that are representative of the one or more road structures comprise program code instructions configured to define the altitude of the ground points of the digital elevation model that were projected onto pixels and are representative of the bridge or the tunnel based upon the altitude of the ground points of the corresponding location that were captured by the different technique other than ground-based LiDAR and projected onto corresponding pixels.

18. A computer program product according to claim 13 wherein the program code instructions configured to extract the plurality of ground points comprise program code instructions configured to project a plurality of ground points onto a pixel of the digital elevation model and define the altitude of the ground point representative of the pixel based upon a statistical measure of the respective altitudes of the ground point projected onto the pixel.

19. A computer program product according to claim 13 wherein the computer-executable program code portions further comprise program code instructions configured to at least partially fill regions in the digital elevation model that lack ground points captured by ground-based LiDAR.

20. A method according to claim 1 further comprising at least partially filling regions in the digital elevation model that lack ground points captured by ground-based LiDAR.

21. An apparatus according to claim 7 wherein the at least one memory and computer program code are further configured to, with the processor, cause the apparatus to at least partially fill regions in the digital elevation model that lack ground points captured by ground-based LiDAR.

* * * * *